(12) United States Patent
Yu et al.

(10) Patent No.: US 12,346,815 B2
(45) Date of Patent: Jul. 1, 2025

(54) META IMITATION LEARNING WITH STRUCTURED SKILL DISCOVERY

(71) Applicant: NEC Laboratories America, Inc., Princeton, NJ (US)

(72) Inventors: Wenchao Yu, Plainsboro, NJ (US); Wei Cheng, Princeton Junction, NJ (US); Haifeng Chen, West Windsor, NJ (US); Yiwei Sun, State College, PA (US)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 18/484,805

(22) Filed: Oct. 11, 2023

(65) Prior Publication Data
US 2024/0037400 A1   Feb. 1, 2024

Related U.S. Application Data

(63) Continuation of application No. 17/391,427, filed on Aug. 2, 2021.

(60) Provisional application No. 63/084,035, filed on Sep. 28, 2020, provisional application No. 63/067,009, filed on Aug. 18, 2020.

(51) Int. Cl.
*G06N 3/08* (2023.01)
*G06N 20/00* (2019.01)

(52) U.S. Cl.
CPC .............. *G06N 3/08* (2013.01); *G06N 20/00* (2019.01)

(58) Field of Classification Search
CPC .......................................................... G06N 3/08
USPC ............................................................ 706/15
See application file for complete search history.

(56) References Cited

U.S. PATENT DOCUMENTS

2022/0092441 A1\*   3/2022   Zhu ........................ G16H 80/00

OTHER PUBLICATIONS

Bacciu et al, A Gentle Introduction to Deep Learning for Graphs, Jun. 15, 2020, https://arxiv.org/pdf/1912.12693 (Year: 2020).\*
Hester et al, Deep Q-learning from Demonstrations, Nov. 22, 2017, https://arxiv.org/pdf/1704.03732 (Year: 2017).\*
Luo et al, Grouped Spatial-Temporal Aggregation for Efficient Action Recognition, Sep. 28, 2019, https://arxiv.org/pdf/1909.13130 (Year: 2019).\*

\* cited by examiner

*Primary Examiner* — Austin Hicks
(74) *Attorney, Agent, or Firm* — Joseph Kolodka

(57) ABSTRACT

A method for acquiring skills through imitation learning by employing a meta imitation learning framework with structured skill discovery (MILD) is presented. The method includes learning behaviors or tasks, by an agent, from demonstrations: by learning to decompose the demonstrations into segments, via a segmentation component, the segments corresponding to skills that are transferrable across different tasks, learning relationships between the skills that are transferrable across the different tasks, employing, via a graph generator, a graph neural network for learning implicit structures of the skills from the demonstrations to define structured skills, and generating policies from the structured skills to allow the agent to acquire the structured skills for application to one or more target tasks.

16 Claims, 10 Drawing Sheets

META IMITATION LEARNING WITH STRUCTURED SKILL DISCOVERY

RELATED APPLICATION INFORMATION

This application is a continuing application of U.S. application Ser. No. 17/391,427, filed Aug. 2, 2021, which claims priority to Provisional Application Nos. 63/067,009, filed on Aug. 18, 2020, and 63/084,035, filed on Sep. 28, 2020, the contents of which are incorporated herein by reference in their entirety.

BACKGROUND

Technical Field

The present invention relates to imitation learning and, more particularly, to methods and systems related to meta imitation learning with structured skill discovery.

Description of the Related Art

Imitation learning allows agents to learn complex behaviors from demonstrations. However, complex tasks often require impractically large numbers of demonstrations. Meta imitation learning offers a promising approach to drastically reduce the number of demonstrations needed for learning a target task by effectively leveraging the experience of learning similar tasks. Existing approaches to meta imitation learning focus on either behavioral cloning or inverse reinforcement learning to learn contextualized policies where context corresponds to either demonstration trajectories in the given tasks or individual states.

SUMMARY

A method for acquiring skills through imitation learning by employing a meta imitation learning framework with structured skill discovery (MILD) is presented. The method includes allowing an agent to learn behaviors or tasks from demonstrations by learning to decompose the demonstrations into segments, via a segmentation component, the segments corresponding to skills that are transferrable across different tasks, learning relationships between the skills that are transferrable across the different tasks, employing, via a graph generator, a graph neural network for learning implicit structures of the skills from the demonstrations to define structured skills, and generating policies from the structured skills to allow the agent to acquire the structured skills for application to one or more target tasks.

A non-transitory computer-readable storage medium comprising a computer-readable program for acquiring skills through imitation learning by employing a meta imitation learning framework with structured skill discovery (MILD) is presented. The computer-readable program when executed on a computer causes the computer to perform the steps of allowing an agent to learn behaviors or tasks from demonstrations by learning to decompose the demonstrations into segments, via a segmentation component, the segments corresponding to skills that are transferrable across different tasks, learning relationships between the skills that are transferrable across the different tasks, employing, via a graph generator, a graph neural network for learning implicit structures of the skills from the demonstrations to define structured skills, and generating policies from the structured skills to allow the agent to acquire the structured skills for application to one or more target tasks.

A system for acquiring skills through imitation learning by employing a meta imitation learning framework with structured skill discovery (MILD) is presented. The system includes an imitation component to minimize a measure of discrepancy between a learned policy and an expert policy, a graph neural network to learn the implicit structure of skills from demonstrations to define structured skills, a meta controller to learn predictable skills, and a segmentation component to learn to decompose the demonstrations into segments corresponding to skills that are transferrable across different tasks concurrently with learning relationships between the skills that are transferrable across the different tasks.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
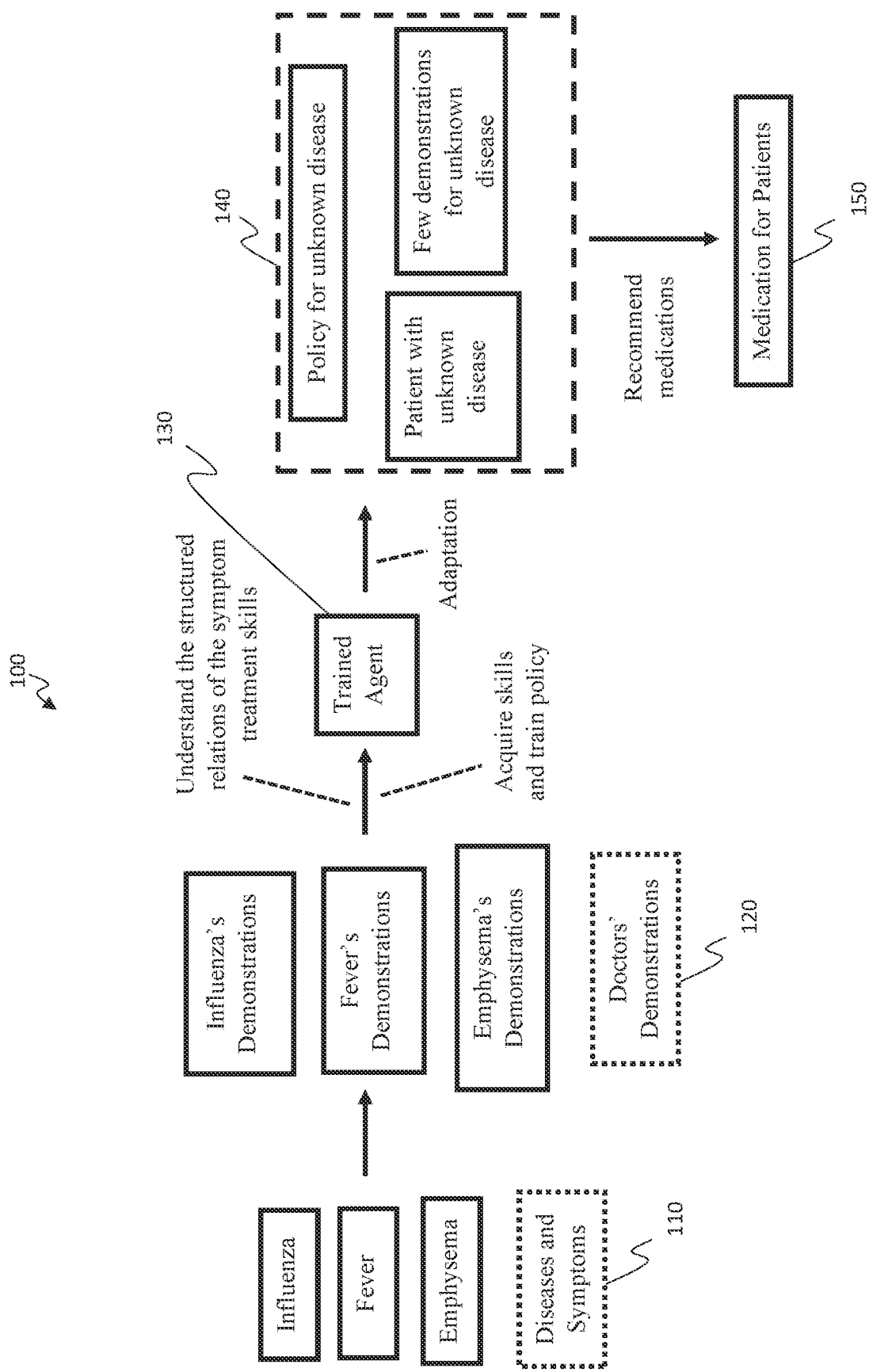
FIG. 1 is a block/flow diagram of an exemplary meta imitation learning framework with structured skill discovery (MILD) for dynamic treatment recommendations, in accordance with embodiments of the present invention.

Imitation learning, which is also referred to as learning from demonstrations, has been shown to be effective at acquiring complex skills for playing games, driving, and even treating patients. However, learning complex tasks from demonstrations often requires impractically large numbers of expert demonstrations. Furthermore, in many real-world settings, such as clinical practice, expert demonstrations can be expensive to acquire.

Meta-imitation learning offers a promising approach to drastically reducing the number of expert demonstrations needed for learning a target task by leveraging the experience of learning similar tasks. Meta-imitation learning combines meta learning with imitation, enabling the learner to leverage past experiences on a diverse set of tasks to take advantage of their shared structure to efficiently learn new skills from a single or a few demonstrations of a target task. Existing approaches to meta-imitation learning fall into one of two categories, that is, methods that rely on behavioral cloning, where learning from demonstrations is treated as a supervised learning problem and policies are trained to regress expert actions from a data set of expert demonstrations, and thus learn policies conditioned on individual states, and methods that rely on inverse reinforcement learning to infer the reward function of the expert, and subsequently train a policy to optimize this reward. Such methods largely fail to scale to complex tasks with few demonstrations.

The exemplary embodiments observe that complex skills are often composed of simpler skills. Hence, it is not unreasonable to expect that simpler skills are more easily transferred compared to more complex skills. The exemplary embodiments therefore hypothesize that the learning of contextualized policies conditioned on segments of the demonstrations or skills that represent sequences of state-action pairs that are likely to be shared among different tasks are likely to be more transferable across tasks than the skills embodied in entire demonstrations of complex tasks and that exploiting the similarities among skills that are part of multiple demonstrations can further improve knowledge transfer across tasks.

To explore this hypothesis, the exemplary embodiments introduce a meta-imitation learning framework with structured skill discovery (MILD) for efficient acquisition of skills through imitation learning. MILD learns to decompose demonstrations into segments that correspond to skills that are transferable across different tasks while simultaneously learning the relationships between skills. Such skills correspond to subsequences of state-action pairs extracted from expert demonstrations that achieve meaningful sub-goals, which can be combined to achieve more complex goals. Acquiring new tasks requires the learner to have a diverse set of skills that can be brought to bear on learning new tasks from single or a few demonstration(s). For example, the exemplary embodiments consider the healthcare setting where the task is to treat a target disease. A target disease shares many symptoms with other related diseases. Thus, the learner can leverage knowledge of how to treat the symptoms (e.g., treatment skills) of related diseases, to effectively learn how to treat a new disease from a single or a few demonstrations by an expert physician.

An example of the overall approach to meta-imitation learning is shown in FIG. 1. The skills are the abilities to cure symptoms for each the disease. Moreover, the MILD model includes several components as detailed in FIG. 2.

Referring to FIG. 1, the MILD structure 100 portrays the diseases and symptoms 110 as well as the doctors' demonstrations 120. The diseases and symptoms 110 can be, e.g., influenza, fever, and emphysema. The doctors' demonstrations 120 can be, e.g., influenza's demonstrations, fever's demonstrations, and emphysemas' demonstrations. Demonstrations can relate to behaviors or tasks. A trained agent 130 can acquire the skills and train policy. The goal is to provide medication 150 for patients for the unknown disease 140. By understanding the ability to cure the symptoms, the trained agent 130 can generalize to the unseen disease with few demonstrations.

Figure 2:
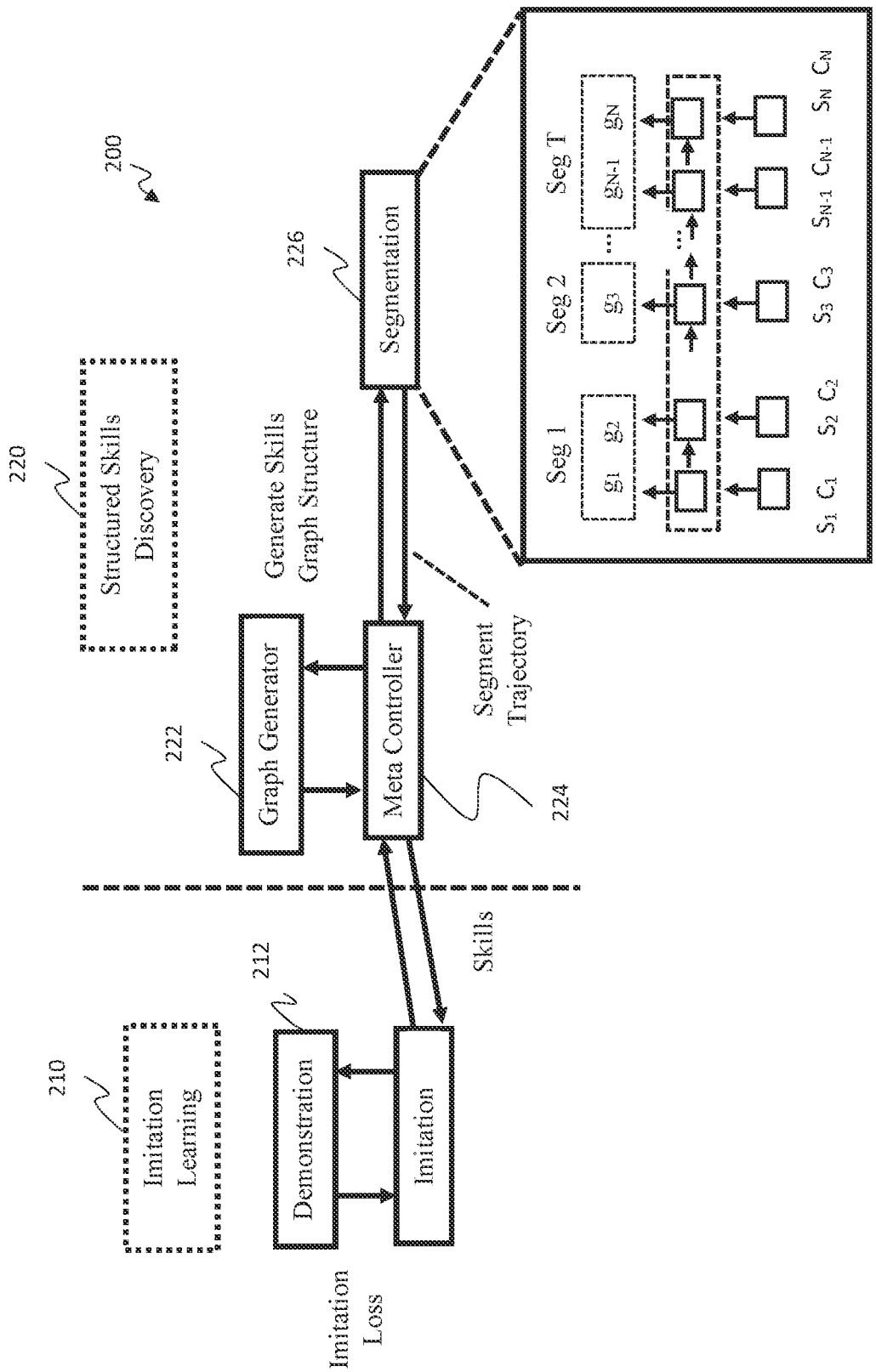
FIG. 2 is a block/flow diagram of an exemplary meta-train process of the MILD, in accordance with embodiments of the present invention.

Regarding FIG. 2, the meta-train process 200 includes several components that are an imitation learning model/component (imitator 210) that minimizes a measure of discrepancy between the learned policy and the expert policy, a graph neural network generated by a graph generator 222 that learns the implicit structure of the skills, a meta controller 224 that learns the predictable skills, and a segmentation module or component (segmentator 226) that learns to decompose demonstrations 212 into segments to support skill acquisition. The structured skills and discovery component 220 thus includes the graph generator 222, the meta controller 224, and the segmentation component 226. The MILD 100 (FIG. 1) shares the knowledge of the learned policy and the structured skills through relational inference.

The exemplary embodiments of the present invention introduce a new approach to meta-imitation learning which learns to decompose demonstrations into segments corresponding to skills and simultaneously or concurrently learns the relationships between skills that assist in skill transfer across tasks. The exemplary embodiments of the present invention provide graph neural networks for learning the implicit structure of the skills from the demonstrations. The exemplary embodiments of the present invention show that MILD can effectively transfer the knowledge learned from one task to another by learning the implicit structure of skills, to efficiently learn from a few demonstrations, outperforming the state-of-the art baselines in both simulated environments and real-world environments.

Regarding imitation learning, let the demonstrations $\mathcal{D} = \{\tau_1, \tau_2, \ldots, \tau_n\}$ be expert trajectories generated by the expert policy $p_{\pi_E}$ for the specific task T. Each trajectory $\tau_i$ includes the state actions pairs: $\tau_i = \{s_0^i, a_0^i, \ldots, s_T^i, a_T^i\}$. The goal of imitation learning is to learn the policy $p_{\pi_\theta}$ from the demonstrations $\mathcal{D}$, to match the performance of the expert policy $p_{\pi_E}$.

Mathematically, the goal of learning the policy $\pi_\theta$ that similar to the expert policy $\pi_E$ could be defined as:

$$\min \mathcal{L}(p_{\pi_E} \| p_{\pi_\theta})$$

where $\mathcal{L}$ represents the distance function and $p_{\pi_\theta}$ represents the targeted policy to learn.

Regarding meta-imitation learning, let $T = \{T_1, T_2, \ldots, T_k\}$ be the K provided training tasks, and the task $T_i$ has the trajectory demonstrations $\mathcal{D}^i = \{\mathcal{D}_1^i, \mathcal{D}_2^i, \ldots, \mathcal{D}_m^i\}$ generated by the expert with the expert policy $p_{\pi_E}^i$. The goal of meta-imitation learning is to learn the policy $p_{\pi_\theta}$ that given the unseen target task $T_{k+1}$ with several demonstrations, it is able to perform similar to the expert policy $p_{\pi_E}^{k+1}$ by leveraging the experience from the training tasks T.

To learn the policy in the meta-imitation learning problem, it is beneficial to learn the experience from the training demonstrations and transfer the knowledge to the target task. In the following section, the exemplary embodiments of the present invention proceed to introduce how the MILD structure solves the meta-imitation learning problem by capturing the knowledge of skills from the demonstrations.

Regarding meta imitation learning via structured skills discovery, to solve the meta-imitation learning problem, the exemplary embodiments of the present invention learn implicit structure of skills which would make transferring the knowledge easier in the meta learning task. Particularly, the exemplary embodiments of the present invention discover the skills which are the macro actions over the subsequences of the segmentation, and the implicit structure of skills with different constrains. With the meta learning framework, the MILD model for learning structured skills can be transferred to the targeted task.

The method for imitation learning via structured skill discovery builds off of several concepts. First, to exploit the context information of the actions, the exemplary embodiments of the present invention assume the policies are conditioned on skill variable c. Skills are learned over the subsequence of the demonstration trajectory $\mathcal{D}$. The exemplary embodiments of the present invention use the variable g as the segmentation of the demonstrations. To ensure the state could predict the segmentation, the exemplary embodiments of the present invention maximize the mutual information between the segmentation g and the state s as I(g; s), where I(•;•) represents the mutual information.

Next, the exemplary embodiments of the present invention aim to learn the predictable skills over the segmentation. To make sure the skills can be inferred from the segmentation, the exemplary embodiments of the present invention maximize the mutual information between the skills and segmentation as I(g; c).

Next, the exemplary embodiments of the present invention learn the implicit structure over the skills. The exemplary embodiments of the present invention assume the skills c are conditioned on the implicit structure X. In the skill implicit graph X, the node $c_i$ denotes the skill i and the edge $c_{ij}$ denotes the implicit relations between the skill i and j. To ensure that the skills are encoded by the implicit graph X, the exemplary embodiments of the present invention minimize the entropy between skills and implicit connections as:

$$H[X|c]$$

where H[•] is the Shannon entropy.

Finally, to ensure that the skills are discovered by the segmentation g but not the states, and the structures are encoded by the graph structured X, the exemplary embodiments of the present invention maximize two mutual information as:

$$I(c,g|s)+I(c,X|g)$$

Given the above assumptions and analysis of the skills and segmentation, in summary, the exemplary embodiments of the present invention aim to maximize the following objective function:

$$\min_{\pi_\theta} \mathcal{L}(p_{\pi_E} \| p_{\pi_\theta}) - H[c] + H[c|X, g] + H[X|c] - H[g] + H[g|s, c]$$

To derive the lower bound of the above equation, the exemplary embodiments of the present invention use the posterior distribution $q_{99}$ (c|X, g), $q_f$(g|c,s), $q_G$(X|c) to approximate p(c|X, g), p(g|c,s), p(X|c), respectively. Here, θ, f and G are the parameters for the models.

The exemplary embodiments of the present invention adopt Jensen's Inequality to derive the variational lower bound as follows:

$$H[c|X,g]+H[X|c]+H[g|s,c]-H[c]-H[g] \geq E_{X \sim p(G), c \sim p(c)}$$
$$[\log q_{99}(c|X,g)])+E_{X \sim p(G), c \sim p(c)}(\log q_G(X|c))+$$
$$E_{s \sim \tau, c \sim p(c)}[\log q_f(g|s,c)]$$

To show the details of the optimization and implementation, the exemplary embodiments of the present invention use an imitation learning model to demonstration the details of the objective.

The framework is as follows:

$$\min_{\pi_\theta} \mathcal{L}(p_{\pi_E} \| p_{\pi_\theta}) \equiv \min_\pi \max_D E_\pi[\log D(s, a)] + E_{\pi_E}[1 - \log D(s, a)] - \gamma H[\pi]$$

where D is the discriminative classifier.

It is noted that the framework can build upon any imitation learning model such as BC and GAIL. Here, the exemplary embodiments of the present invention present the optimized objective function as described below:

$$\min_{\pi, \phi, G} \max_D E_\pi[\log D(s, p_\pi(a|s, c))] - \gamma H[\pi] +$$
$$E_{\pi_E}[1 - \log D(s, p_\pi(a|s, c))] + E_{X \sim p(z), c \sim p(c)}[\log q_\phi(c|X, g)]) +$$
$$E_{X \sim p(z), c \sim p(c)}(\log q_G(X|c)) + E_{s \sim \tau, c \sim p(c)}[\log q_f(g|s, c)]$$

where π, ϕ, f and G, respectively denote the parameters for the imitation learning, meta controller, segmentation, and graph generator. The above equation is naturally comprised of four components, that is, the imitation learning module (imitator 210), the segmentation module (segmentator 226), the meta controller module/component 224, and the graph inference module/component 222 as shown in FIG. 2.

Regarding skills discovery, as shown in FIG. 2, the imitation learning module optimizes the policy $p_\pi$ over the actions a used in the demonstrations. The policy computes actions a as a function of the current state s and skills c. The skills associated with the actions are learned by the meta controller module 224. Once the meta controller module 224 learns a suitable representation of skills, any feasible imitation learning scheme can be used to optimize the policy p(a|s). The predicted actions are used to estimate the loss of the learned policy relative to the expert policy.

To better learn the representation of the skills, the exemplary embodiments of the present invention adopt the meta controller 224 that maximizes the skill distribution c over the implicit relations of the skills and the segmentation of the demonstrations. The implicit relations between skills are learned from the graph generator module 222, and meaningful segmentation of the expert demonstrations are produced by the segmentation module 226. The exemplary embodiments of the present invention adopt a graph decoder (described below) to infer the structured skills. The segmentation module 226 outputs the segmentation g associated with state s and skill c as shown in the FIG. 2. Once the skills are learned by the meta controller 224, the segmentation module 226 uses the learned skills to learn a segmentation indicator that denotes the association between states and the segments. The exemplary embodiments of the present invention use long short-term memory (LSTM) to capture the temporal dependencies within each demonstration. The LSTM accepts as input, the state embedding s and skill embedding c and outputs the segmentation indicator g for each state s.

Regarding structured relation inference, the exemplary embodiments of the present invention proceed to describe how to learn the implicit relations between the skills. The graph generator leverages a graph relation inference model.

Given the skills c with nodes c={$c_1$, . . . , $c_N$}, the exemplary embodiments of the present invention aim to learn the implicit structure X of the skill c where the edges $c_{ij}$ represent the implicit relations of the skills $c_i$ and $c_j$. The relation inference model includes two jointly trained part, that is, the graph generator encoder $q_G$(X|c) that predicts the graph probability distribution p(z) over the latent interactions of the skills c, and the graph decoder $p_{99}$ (c|g, X) in the meta controller module 224 that generates skills conditioned on the graph structure X.

In the absence of prior knowledge of the skills, the exemplary embodiments of the present invention can use the graph neural network (GNN) defined on the fully connected graph wherein each skill is denoted by a node, to predict the latent graph structure X.

Mathematically, the GNN training problem can be formulated as follows:

$$h_i^k = f_{emb}(h_i^{k-1})$$

$$e_{ij}^k = \sigma([h_i^k, h_j^k])$$

$$h_i^{k+1} = f_\phi\left(W^k \sum_{i \neq j} e_{ij}^k + B^k\right)$$

where $f_{emb}$ and $f_\phi$ are neural networks, $h_i$ is the representation for skill i, $e_{ij}$ is the representation for an edge between skill i and j, and W and B are the model parameters.

Here, k represents the k-th layer embedding in the neural network. $\sigma$ is the non-linear activation function (e.g., ReLU or tan h). W and B are the parameters to be learned. The edge posterior $q_\theta(z_{ij}|c)$ is estimated by the $e_{ij}^k$. The exemplary embodiments of the present invention estimate graph variable z and construct the graph $\hat{X}$ by calculating the $e_{ij}^k$.

Once the graph structure $\hat{X}$ is learned by the graph encoder, the exemplary embodiments of the present invention use a second GNN as the graph decoder to capture the implicit relations among the skill c.

Mathematically, the GNN can be formulated as follows:

$$e_{ij}^t = \sum_{j \in N_i} f_e(h_i^t, h_j^t)$$

$$\mu_i^{t+1} = h_i^t + f_v\left(\sum_{j \in N_i} e_{ij}^t\right)$$

where $f_e$ and $f_v$ are two fully connected networks (MLPs), t is the learning iteration. The posterior skills distribution are estimated by the condition probability $p_G(c_i^{t+1}|X, c_i^t)$.

The detailed algorithm for the imitation learning model is given as Algorithm 1.

---

Algorithm 1: Imitation learning for structured skill discovery

---

Input: Expert Trajectory $\tau_E$, Total Training Epoch T, Graph
    Training Epoch L, Imitation Learning Model Training Epoch M
Output: Policy Network $q_\theta$, Meta-controller $q_\theta$, Graph Generator
    $q_G$, Skill Implicit Graph G
1 Randomly initialize skill embedding c;
2 while t ≤ T do
3   | Use Meta-controller to obtain the segmentation from trajectory
    | $\tau_E$;
4   | while m ≤ M do
5   |   | Use $q_\theta$, $q_\phi$, $q_G$ to infer the expert's actions and calculate
    |   | the imitation learning loss;
6   |   | Update $\pi_\theta$, $q_\theta$, and $q_G$ according to the imitation loss;
7   | end
8   | while l ≤ L do
9   |   | Update $q_G$ according to skills reconstruct loss;
10  |   | Use $q_G$ to update implicit structure $\hat{G}$;
11  | end
12  | Use $q_G$ generate the skill embedding c;
13 end

---

Regarding structured skill transfer, after training the parameters for the imitation learning model as described above, the exemplary embodiments of the present invention adopt a meta learning framework to transfer the structured skills learned from tasks T={$T_1, \ldots T_l$} to the desired target task. To minimize notational clutter, in what follows, the exemplary embodiments of the present invention use $\theta$ to denote all of parameters of the imitation learning model.

In meta-training phase, the parameter is computed using one or more gradient descent steps that are updated on each task $T_i$.

The equation is summarized as:

$$\theta_i' = \theta - a\nabla_\theta \mathcal{L}_{T_i}(f_\theta)$$

where $\theta$ includes all the variables in the imitation learning model as discussed.

It is noted that the graph variable describes the general implicit relations shared by all the tasks. The meta optimization across tasks T are performed via stochastic gradient descent (SGD), such that the model parameters $\theta$ are updated as follows:

$$\hat{\theta} = \theta - \beta\Sigma_T \nabla_\theta \mathcal{L}_{T_i}(f_{\theta_i})$$

All the parameters are transferred to the targeted task as presented in Algorithm 2.

---

Algorithm 2: Training for Imitation Learning

---

Input: Tasks demonstrations, $\alpha$, $\beta$
Output: Meta Learner Parameters
1 Randomly initialize the parameters $\theta$ for Policy Network,
    Meta-controller, Graph Generator;
2 while not done do
3   | while t ≤ T do
4   |   | Sample task $\mathcal{T}_i$ from Tasks $\mathcal{T}$;
5   |   | Calculate $\nabla_\theta \mathcal{L}\mathcal{T}_i(f_\theta)$ according to imitation learning
    |   | model and Algo.1;
6   |   | Update $\hat{\theta}_i := \theta - \alpha\nabla_\theta \mathcal{L}\mathcal{T}_i(f_\theta)$:
7   | end
8   | Update $\hat{\theta} = \theta - \beta \Sigma_T \nabla_\theta \mathcal{L}\mathcal{T}_i(f_{\theta_i})$
9 end

---

After the meta learner is updated, in the meta-training phase, the exemplary embodiments of the present invention aim to minimize the meta learning loss as:

$$\min_\theta \sum_{\mathcal{T}_i} \sum_{D_i^{val} \sim D^*} E\left[f(\theta - \alpha\nabla_\theta f(\theta, D_i^{tr}), D_i^{val}\right]$$

Figure 3:
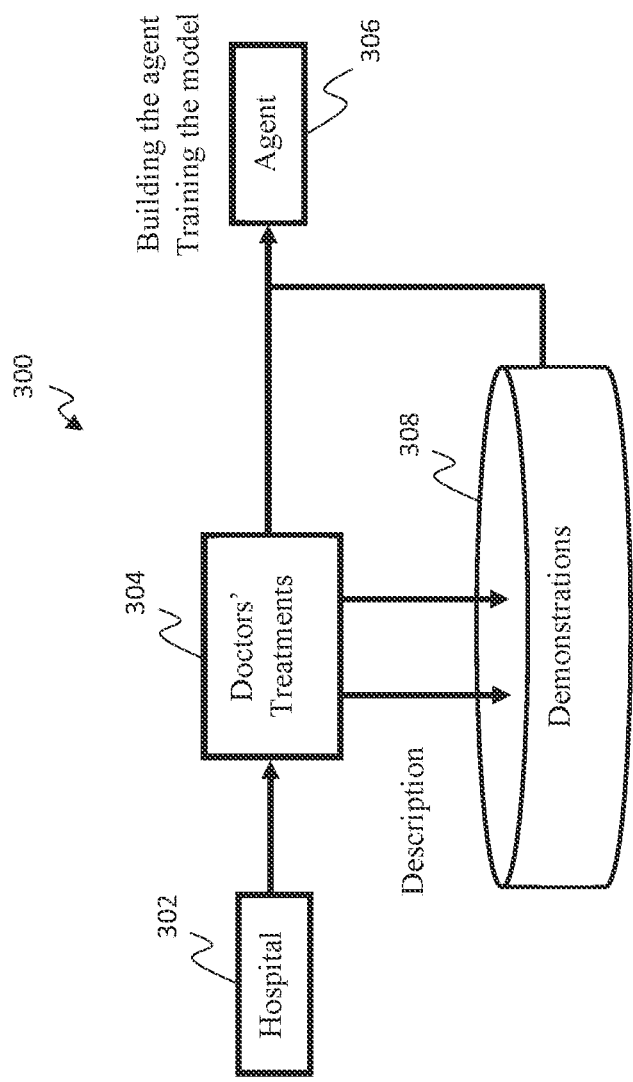
FIG. 3 is a block/flow diagram of an exemplary practical application in a training imitation learning model, in accordance with embodiments of the present invention.
Figure 4:
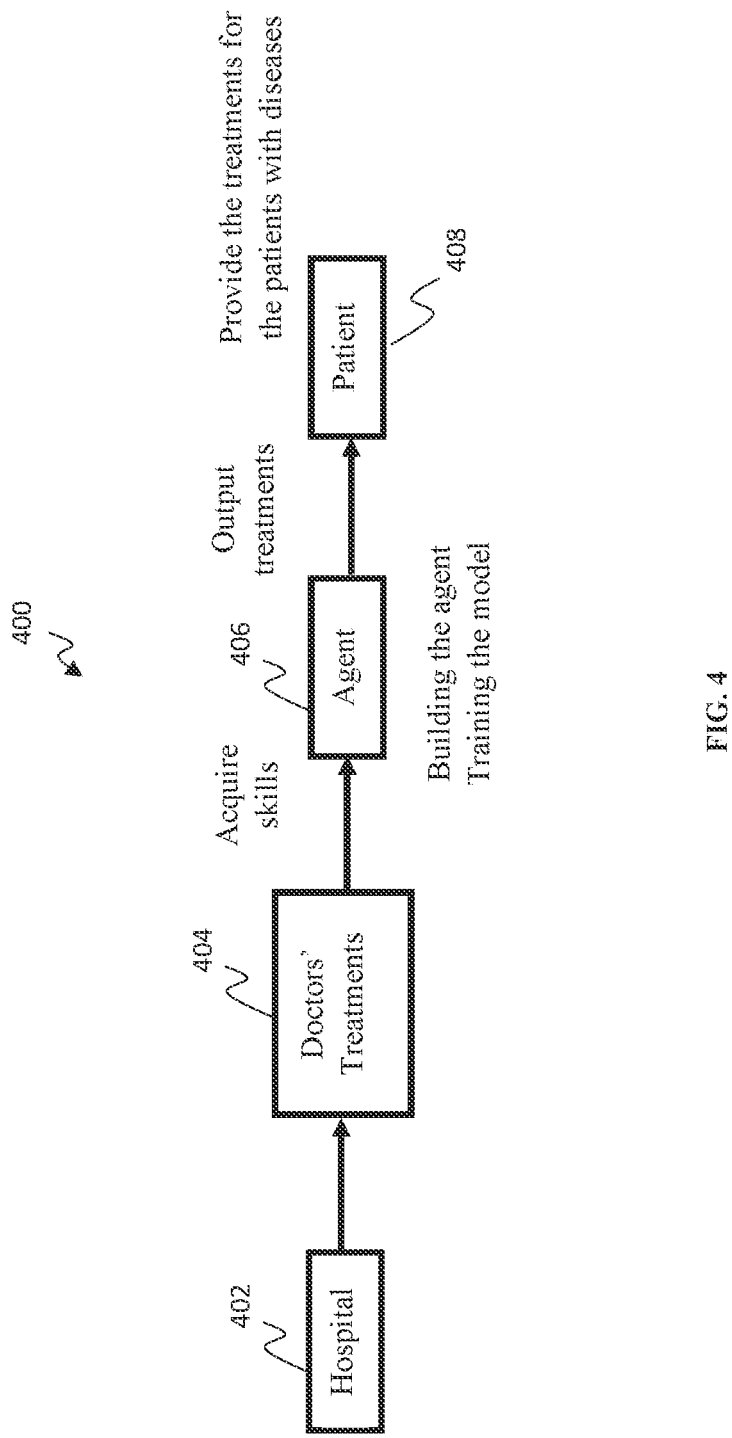
FIG. 4 is a block/flow diagram of an exemplary practical application in curing a patient, in accordance with embodiments of the present invention.

FIG. 3 is a block/flow diagram 300 of an exemplary practical application in a training imitation learning model, in accordance with embodiments of the present invention and FIG. 4 is a block/flow diagram 400 of an exemplary practical application in curing a patient, in accordance with embodiments of the present invention.

In FIG. 3, the training imitation learning model can be applied in a hospital setting 302 The prediction model is built by using the doctors' treatments 304. The agent 306 acquires skills for curing the symptoms and recommends feasible treatments based on the demonstrations 308.

In FIG. 4, a scenario for curing the patient also can occur in a hospital setting 402. The prediction model is built by using the doctors' treatments 404. The agent 406 acquires skills for curing the symptoms of a patient 408 and recommends feasible treatments.

Meta-imitation learning, also referred to as imitation learning with knowledge transferring, is the task to learn the policy for the agent to mimic the expert given few or limited experts' demonstrations. In the learning procedure, few experts' demonstrations for the targeted task and expert demonstrations for the related tasks are provided. The targeted task is the task which only have limited experts' demonstrations and the related tasks are the tasks which share some similarities with the targeted tasks. The agent can learn from the given demonstrations, act like experts, and output the demonstration for the targeted task. The exemplary embodiments transfer the model with the structured-skill discovery. The definition of the skill is the meaningful subsequence of the experts' demonstrations which can facilitate the learning of the model. The skills depict the abilities to finish the targeted tasks. The skills have the implicit relations, also known as graph structures, between each other. The present invention can be used for meta-imitation learning and general imitation learning for the agent.

There are many domains or practical scenarios which the present invention is applicable to. The healthcare domain is one of those examples. In general, in healthcare domain, the doctors' treatments to the patients for curing the patients' diseases are the expert demonstrations. In this task, limited doctors' treatments for the targeted diseases and the treatments for the related diseases are provided. The skills are the abilities to cure symptoms for each of the diseases. The ability to cure the symptoms have an implicit structure since the disease usually involves multiple symptoms. The agent needs to acquire the skill for curing the symptoms, act as the doctor, and provide feasible treatments to the patients with the same diseases.

A practical example in the healthcare domain is shown in FIG. 3 and FIG. 4. To simplify, the model cures one type of disease. However, the application is not limited to this scenario. At first, a prediction model is built given the patients' body characteristics and the doctor's treatments. Once the model is trained, it acts as the doctors and gives the treatments for the other patients with the same diseases. The present invention solves the problem in learning from few demonstrations. It benefits not only from imitation learning accuracy for the targeted task but also for learning the general imitation learning agent.

In practice, it is expensive and time consuming to train the expert to generate the demonstrations for the targeted task. The exemplary embodiments learn from few demonstrations via structured skill sharing. The exemplary embodiments leverage the demonstrations from the related tasks to train the model and learn the skills. As for the targeted task, the exemplary embodiments only have few high-quality demonstrations, and thus the proposed model (MILD) can transfer the learned structured skills from related tasks to the targeted task which has the insufficient demonstrations.

Consequently, the exemplary embodiments of the present invention can learn the policy given few demonstrations of the targeted task. The exemplary embodiments share the knowledge from the related tasks to the targeted task. Thus, it is possible to learn the policy given few demonstrations from experts. The exemplary embodiments further learn the meaningful subsequences from the trajectory or trajectories. The exemplary embodiments learn the meaningful subsequence of the trajectories to benefit the learning of the skills. The exemplary embodiments also add the assumptions on the segmentation to ensure the learned segmentations are predictable. The exemplary embodiments also share the knowledge in the skill level. Different from sharing the knowledge in the action level or in the trajectory level, in the exemplary embodiments, the knowledge is shared from the related tasks targeted in the skill level. The exemplary embodiments also learn the meaningful skills from the trajectory or trajectories. Further, the exemplary embodiments allow the agent to acquire the useful skills from the related tasks to the targeted task.

Figure 5:
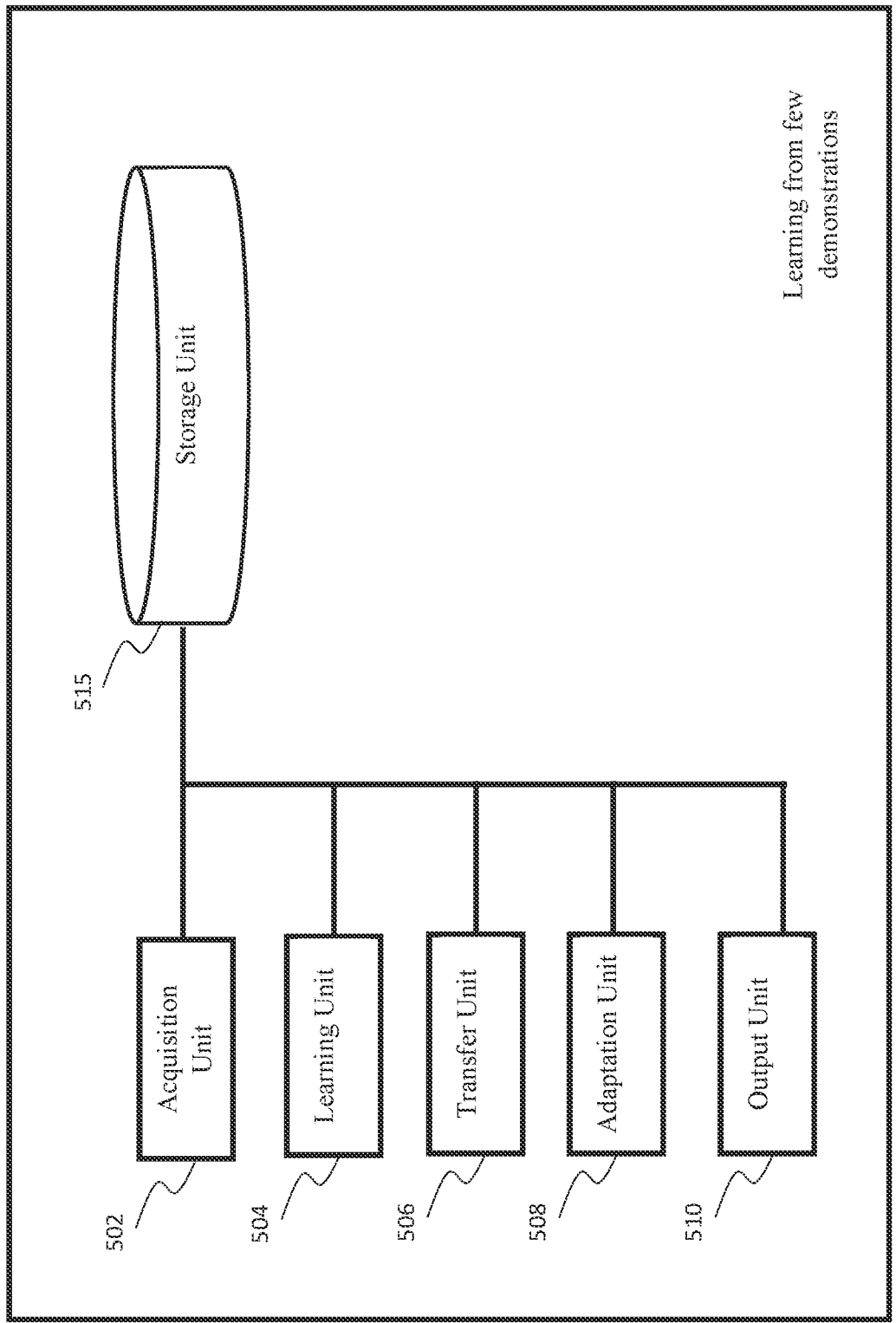
FIG. 5 is a block/flow diagram of a meta-imitation learning system, in accordance with embodiments of the present invention.

FIG. 5 is a block/flow diagram of a meta-imitation learning system, in accordance with embodiments of the present invention.

The block diagram includes an acquisition unit 502, a learning unit 504, a transfer unit 506, an adaptation unit 508, and an output unit 510. The units can also be referred to as components or devices or systems or sub-systems. A storage unit 515 can be used to store the models. Acquisition unit 502 obtains the demonstrations from the experts for training the model, transfers the learned skills, and outputs the learned policy. The storage unit 515 stores the models, the learned policy, the representations of skills, and the output demonstration. The learning unit 504 is used for training the model. The transfer unit 506 is used for transferring the learned policy and skills. The adaptation unit 508 is used for training the learned policy on the targeted task. The output unit 510 controls the output of the trajectory similar to experts' demonstrations.

Figure 6:
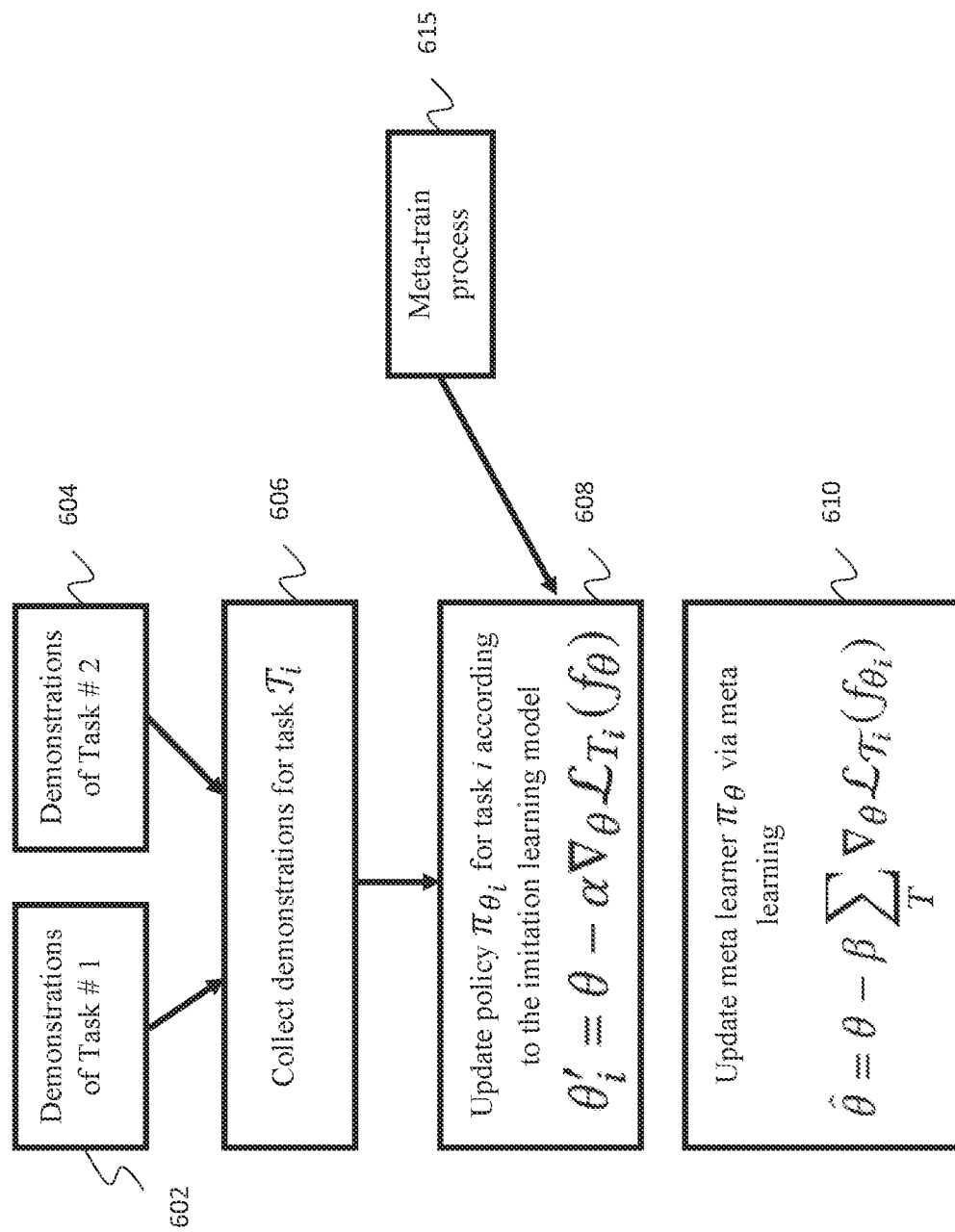
FIG. 6 is a block/flow diagram of a meta train framework, in accordance with embodiments of the present invention.
Figure 7:
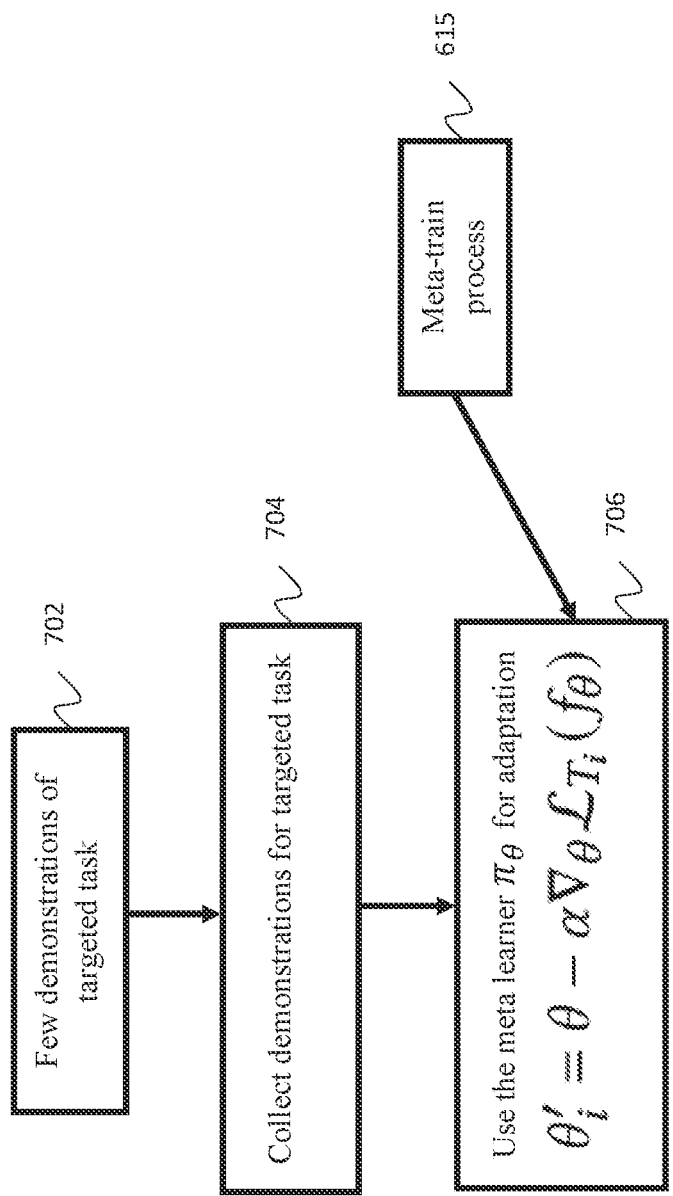
FIG. 7 is a block/flow diagram of a meta test framework, in accordance with embodiments of the present invention.

FIG. 6 is a block/flow diagram of a meta train framework, in accordance with embodiments of the present invention and FIG. 7 is a block/flow diagram of a meta test framework, in accordance with embodiments of the present invention.

The inputs of learning from few demonstrations are few demonstrations of the targeted task and the demonstrations of the related tasks. The output of learning from few demonstrations is the learned policy for the agent which can give demonstrations similar to the experts. Given the experts' demonstrations for the related tasks, the exemplary embodiments learn the segmentation of the demonstrations which helps to learn the skills. The exemplary embodiments learn the structured and predictable skills from the demonstrations and adopt the meta learning-based framework to share the knowledge from the related task to the targeted task.

The knowledge transferring framework includes two phases in a meta-train process 615, that is, the meta-train phase as shown in FIG. 6 and the meta-test phase as shown in FIG. 7. During the meta-train phase, in the first step, the exemplary embodiments collect the demonstrations 606 from the related tasks 602, 604. In the second step, the exemplary embodiments use the imitation learning model (MILD) to compute the meta gradient step (608) for each task. In the third step, the model updates (610) the meta learner and the skills with the meta gradient computed in the second step. The meta learner and skills with its implicit relations are used in the meta-test phase.

In the meta-test phase, the model firstly collects the demonstrations (704) for the targeted task, and then adapts the meta learner (706) which is learned in the meta-train phase to the few demonstrations for the targeted task (702). The process 615 is based on the meta learning framework. The model for the agent's policy and the learned skills with its implicit relations are transferred to the meta-test phase.

The input demonstrations used in FIGS. 6 and 7 for both targeted and related tasks include the state s and the action a. Given few demonstrations for the targeted task, the exemplary embodiments aim to output the learned skill c, the implicit graph of the skill c, the segmentation model g, and the learned policy π for the targeted tasks.

The general imitation loss is presented as $L(\pi_E \| \pi)$. The exemplary embodiments aim to minimize the distances between the distribution of expert policy and the distribution of learned policy for the targeted task. To improve the generalization ability and the accuracy, the exemplary embodiments learn the structured skills with the imitation learning model. For the imitation learning model, given the demonstrations, MILD learns the meaningful segmentations of the demonstrations and the corresponding skills. Different from previous works which share the knowledges in the action level or trajectory level, the exemplary embodiments share the knowledge in the skill level. Sharing the knowledge in the action level would lose the context information between actions. Sharing the knowledge in the trajectory level would present a data insufficient issue, since the trajectories are hardly the same in the related tasks and targeted task. To learn the meaningful skills which benefit the agent to mimic the expert's demonstrations, the exemplary embodiments learn the structured and predictable skills as described with respect to $I(g; c)+I(c; X|g)-H(X|c)$.

The mutual information $I(g; c)$ indicates the distribution of the skill c and the segmentation g are strongly related. Maximizing the mutual information $I(c; X|g)$ indicates that, given the distribution of the segmentation, the distribution of skill c and the implicit graph of the skill X are strongly correlated. By minimizing the two mutual information terms, the exemplary embodiments can have predictable skills.

The conditional entropy $H(X|c)$ describes the relations between skill c with its implicit graph. To maximize the conditional entropy, the exemplary embodiments ensure that the learned graph has the implicit graph structure. Other than the assumptions on the skill, the exemplary embodiments introduce the mutual information term between the variables of segmentation g, the state s and the skill c. The equations for the predictable segmentation are presented as follows:

$$I(g;s)+I(g;c|s)$$

The first term describes the correlations between the segmentation g and the state s. By maximizing this mutual information, it implies the segmentation and the state could infer each other. The second term $I(g; c|s)$ describes the correlations of the segmentation g and the skill c given the variable of the state.

To train the variables in the imitation learning model, it minimizes the loss as shown below:

$$\min L(\pi_E\|\pi)-(I(g;c)+I(c;X|g)-H(X|c))-(I(g;s)+I(g;c|s))$$

which includes three components. The first component $L(\pi_E\|\pi)$ measures the distances between the expert's policy and the policy learned from few demonstrations. The second component $I(g; c)+I(c; X|g)-H(X|c)$ ensures the exemplary embodiments learn the structured and predictable skills. The third component $I(g; s)+I(g; c|s)$ ensures that the exemplary embodiments learn the predictable and meaningful segmentations. By minimizing the loss function, the exemplary embodiments can have the policy which is similar to the expert's policy with the predictable and structured skills, and the predictable segmentation.

By minimizing the equation:

$$\min L(\pi_E\|\pi)-(I(g;c)+I(c;X|g)-H(X|c))-(I(g;s)+I(g;c|s))$$

the exemplary embodiments can derive the inequality constraints as shown below:

$$\min_{\pi,\phi,G} \max_D E_\pi[\log D(s, p_\pi(a|s, c))] - \gamma H[\pi] +$$
$$E_{\pi_E}[1 - \log D(s, p_\pi(a|s, c))] + E_{X\sim p(z), c\sim p(c)}[\log q_\phi(c|X, g)] +$$
$$E_{X\sim p(z), c\sim p(c)}(\log q_G(X|c)) + E_{s\sim\tau, c\sim p(c)}[\log q_f(g|s, c)]$$

In the inequality function, each line refers to one component in the function. The first term is for the imitation learning part. It takes the skills and the states as input and outputs the predicted action. For the imitation learning model, the exemplary embodiments can adopt the supervised learning-based methods such as Behavior Cloning (BC) or GAIL, the GAN-style method GAIL. Here, the exemplary embodiments use GAIL as the example for the derivative. Other methods such as BC can also be used here. The second term is for the meta controller which outputs the skill variable c. The third term is for the segmentation part. It outputs the learned meaningful segmentation of the input demonstrations. The last term is for the graph generation part, where the exemplary embodiments input the embedding of the skills and output the implicit graph of the skills.

The detailed model figure for the imitation learning model is presented as $h_j^1=f_G(c_j)$.

For the graph generation component, the exemplary embodiments adopt the relational inference model as $h_j^1=f_G(c_j)$ to infer the implicit relations of the skills.

The exemplary embodiments use multiple layers of the graph neural networks and the exemplary embodiments only present the model for one layer. For the segmentation part, the exemplary embodiments use LSTM to capture the time dependency in the trajectory. The inputs of the LSTM are the state and learned skill as shown in $h_j^1=f_G(c_j)$. The output of the LSTM model is the index of the segmentations. The same indexes of the segmentations represent the same skills. The exemplary embodiments use the multi-layer perceptron (MLP) for the meta controller model. The input of the meta controller is segmentation indexes and the graph structure. The output of the meta controller is the representations of the skills. The imitation learning can be implemented differently according to different imitation learning models. The input of the imitation learning model is the representation concatenation of the state and its corresponding skills. For the graph generation component and the meta controller, the exemplary embodiments use the reconstruction loss to guide the optimization of the variables. After the model outputs the predicted action for each state, the model computes the overall imitation loss and updates all the parameters according to the imitation loss.

In summary, the exemplary embodiments hypothesize that learning of contextualized policy conditioned on segments of the demonstrations or skills that are likely to be shared among different tasks are more transferable across tasks and that exploiting the similarities and the implicit structure among skills can further improve knowledge transfer across tasks. To explore this hypothesis, the exemplary embodiments implement a meta imitation learning framework with structured skill discovery (MILD) for efficient acquisition of skills through imitation learning. MILD learns to decompose demonstrations into segments that correspond to skills that are transferable across different tasks while simultaneously learning the relationships between skills.

Figure 8:
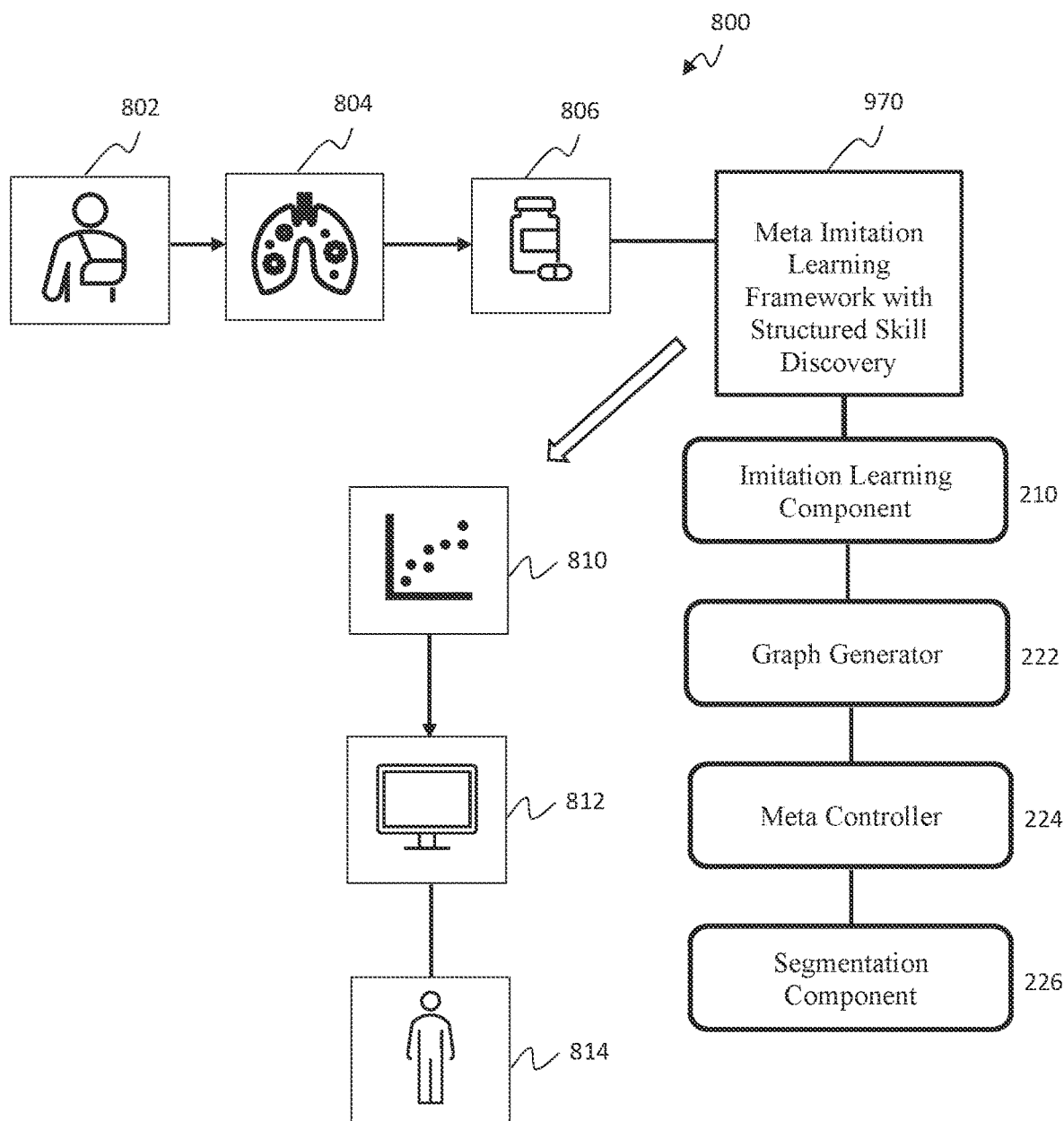
FIG. 8 is an exemplary practical application for the MILD, in accordance with embodiments of the present invention.

FIG. 8 is a block/flow diagram 800 of a practical application of the MILD, in accordance with embodiments of the present invention.

In one practical example, a patient 802 needs to receive medication 806 for a disease 804. Options are computed for indicating different levels of dosages of the medication 806. The exemplary methods learn from few demonstrations by applying a meta imitation learning framework with structured skill discovery (MILD). The MILD architecture 970 is implemented via an imitation learning component 210, a graph generator 222, a meta controller 224, and a segmentation component 226. In one instance, MILD 970 can chose the low-dosage option for the patient 802. The results 810 (e.g., dosage options) can be provided or displayed on a user interface 812 handled by a user 814.

Figure 9:
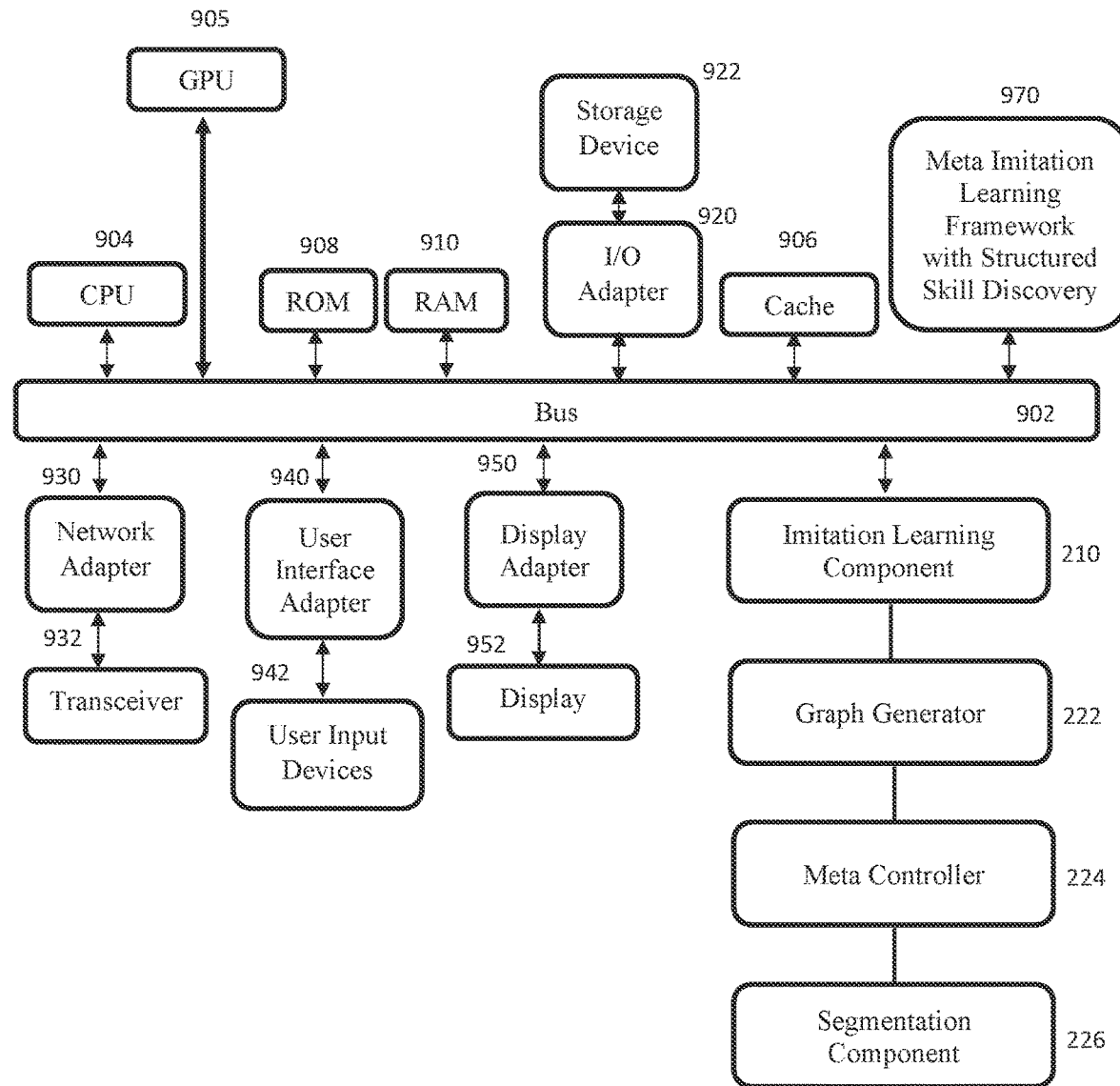
FIG. 9 is an exemplary processing system for the MILD, in accordance with embodiments of the present invention.

FIG. 9 is an exemplary processing system for the MILD, in accordance with embodiments of the present invention.

The processing system includes at least one processor (CPU) 904 operatively coupled to other components via a system bus 902. A GPU 905, a cache 906, a Read Only Memory (ROM) 908, a Random Access Memory (RAM) 910, an input/output (I/O) adapter 920, a network adapter 930, a user interface adapter 940, and a display adapter 950, are operatively coupled to the system bus 902. Additionally, meta imitation learning framework with structured skill discovery (MILD) 970 can be employed to execute an imitation learning component 210, a graph generator 222, a meta controller 224, and a segmentation component 226.

A storage device 922 is operatively coupled to system bus 902 by the I/O adapter 920. The storage device 922 can be any of a disk storage device (e.g., a magnetic or optical disk storage device), a solid-state magnetic device, and so forth.

A transceiver 932 is operatively coupled to system bus 902 by network adapter 930.

User input devices 942 are operatively coupled to system bus 902 by user interface adapter 940. The user input devices 942 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 942 can be the same type of user input device or different types of user input devices. The user input devices 942 are used to input and output information to and from the processing system.

A display device 952 is operatively coupled to system bus 902 by display adapter 950.

Of course, the processing system may also include other elements (not shown), as readily contemplated by one of skill in the art, as well as omit certain elements. For example, various other input devices and/or output devices can be included in the system, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system are readily contemplated by one of ordinary skill in the art given the teachings of the present invention provided herein.

Figure 10:
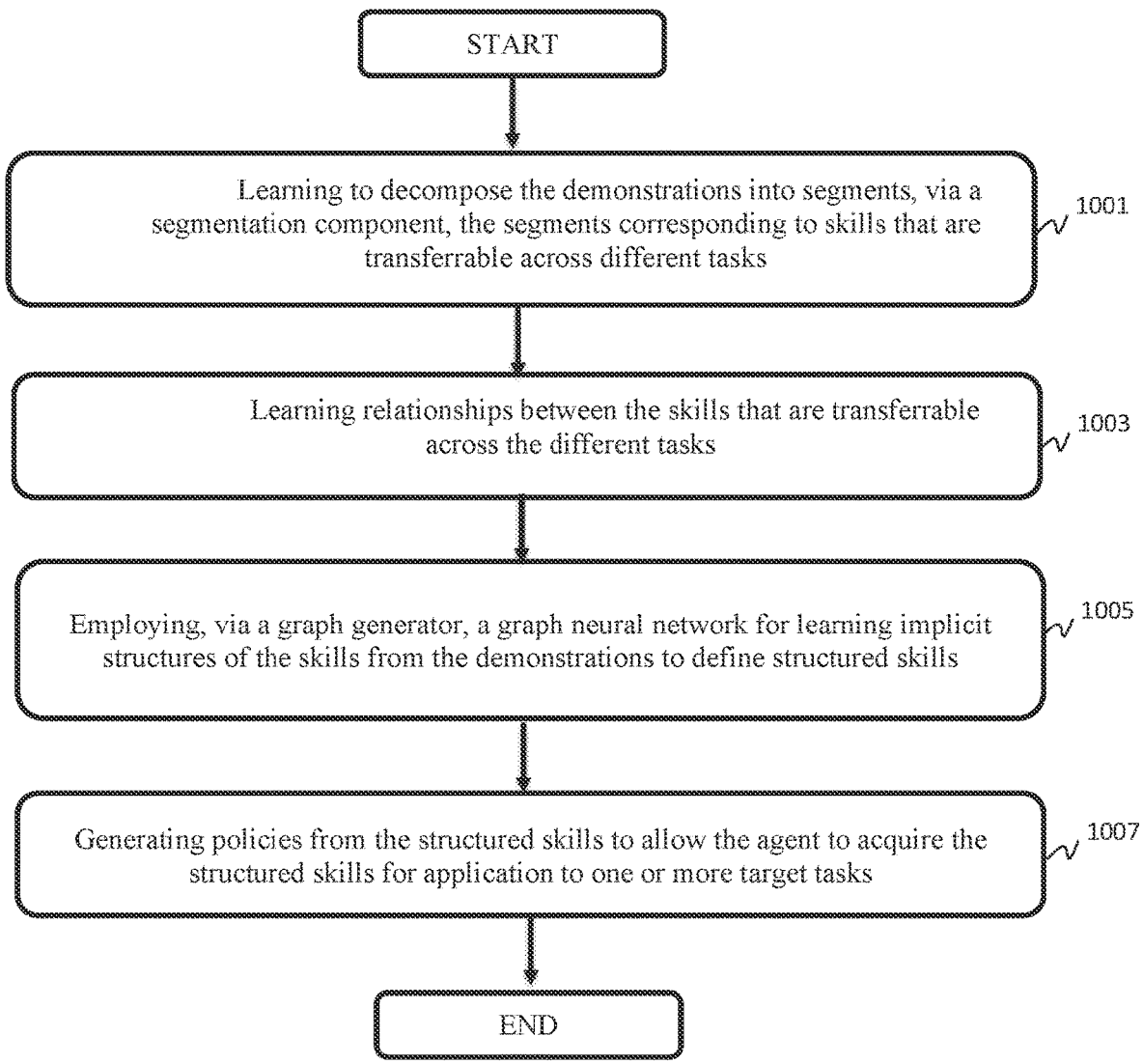
FIG. 10 is a block/flow diagram of an exemplary method for executing the MILD, in accordance with embodiments of the present invention.

FIG. 10 is a block/flow diagram of an exemplary method for executing the MILD, in accordance with embodiments of the present invention.

At block 1001, learn to decompose the demonstrations into segments, via a segmentation component, the segments corresponding to skills that are transferrable across different tasks.

At block 1003, learn relationships between the skills that are transferrable across the different tasks.

At block 1005, employ, via a graph generator, a graph neural network for learning implicit structures of the skills from the demonstrations to define structured skills.

At block 1007, generate policies from the structured skills to allow the agent to acquire the structured skills for application to one or more target tasks.

As used herein, the terms "data," "content," "information" and similar terms can be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data can be received directly from the another computing device or can be received indirectly via one or more intermediary computing devices, such as, for example, one or more servers, relays, routers, network access points, base stations, and/or the like. Similarly, where a computing device is described herein to send data to another computing device, the data can be sent directly to the another computing device or can be sent indirectly via one or more intermediary computing devices, such as, for example, one or more servers, relays, routers, network access points, base stations, and/or the like.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," "calculator," "device," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can include, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks or modules.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks or modules.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for acquiring skills of medication through imitation learning, the method comprising:
    learning behaviors or tasks, by an agent, from medical treatment demonstrations for a given disease by:
        learning to decompose the demonstrations into segments, via a segmentation component, the segments corresponding to skills that are transferrable across different tasks;
        learning relationships between the skills;
        employing, via a graph generator, a graph neural network for learning implicit structures of the skills from the demonstrations to define structured skills; and
        generating policies for medication from the structured skills to allow the agent to acquire the structured skills for application to one or more target tasks by optimizing an objective function:

$$\min_{\pi\theta} \mathcal{L}(p_{\pi_E} \| p_{\pi_\theta}) - H[c] + H[c|X, g] + H[X|c] - H[g] + H[g|s, c]$$

wherein $p_{\pi_\theta}$ is a generated policy with parameters $\pi_\theta$, $p_{\pi_E}$ is an expert policy, $\mathcal{L}$ is a distance function, H is a Shannon entropy function, c is a set of skills, X is an implicit structure, g is a segmentation, and s is a state; and
    providing a medication to a patient in accordance with the generated policies to treat the given disease.

2. The method of claim 1, wherein the demonstrations are expert trajectories generated by an expert policy for medication.

3. The method of claim 2, wherein each of the expert trajectories includes state-action pairs.

4. The method of claim 3, wherein the skills correspond to subsequences of the state-action pairs extracted from the expert trajectories.

5. The method of claim 1, wherein the relationship between the skills is learned by employing a graph generator decoder to predict a graph probability distribution over latent interaction of the skills and a graph decoder to generate skills conditioned on a graph structure.

6. A non-transitory computer-readable storage medium comprising a computer-readable program for acquiring skills of medication through imitation learning, wherein the computer-readable program when executed on a computer causes the computer to perform the steps of:

learning behaviors or tasks, by an agent, from medical treatment demonstrations of a given disease by:
  learning to decompose the demonstrations into segments, via a segmentation component, the segments corresponding to skills that are transferrable across different tasks;
  learning relationships between the skills;
  employing, via a graph generator, a graph neural network for learning implicit structures of the skills from the demonstrations to define structured skills; and
  generating policies for medication from the structured skills to allow the agent to acquire the structured skills for application to one or more target tasks by optimizing an objective function:

$$\min_{\pi\theta}\mathcal{L}(p_{\pi_E}\|p_{\pi_\theta}) - H[c] + H[c|X, g] + H[X|c] - H[g] + H[g|s, c]$$

wherein $p_{\pi_\theta}$ is a generated policy with parameters $\pi_\theta$, $p_{\pi_E}$ is an expert policy, $\mathcal{L}$ is a distance function, H is a Shannon entropy function, c is a set of skills, X is an implicit structure, g is a segmentation, and s is a state; and
providing a medication to a patient in accordance with the generated policies to treat the given disease.

7. The non-transitory computer-readable storage medium of claim 6, wherein the demonstrations are expert trajectories generated by an expert policy for medication.

8. The non-transitory computer-readable storage medium of claim 7, wherein each of the expert trajectories includes state-action pairs.

9. The non-transitory computer-readable storage medium of claim 8, wherein the skills correspond to subsequences of the state-action pairs extracted from the expert trajectories.

10. The non-transitory computer-readable storage medium of claim 6, wherein the relationship between the skills is learned by employing a graph generator decoder to predict a graph probability distribution over latent interaction of the skills and a graph decoder to generate skills conditioned on a graph structure.

11. A system for acquiring skills of medication through imitation learning, the system comprising:
  an imitation component to minimize a measure of discrepancy between a learned policy and an expert policy for medication by optimizing an objective function:

$$\min_{\pi\theta}\mathcal{L}(p_{\pi_E}\|p_{\pi_\theta}) - H[c] + H[c|X, g] + H[X|c] - H[g] + H[g|s, c]$$

wherein $p_{\pi_\theta}$ is a generated policy with parameters $\pi_\theta$, $p_{\pi_E}$ is an expert policy, $\mathcal{L}$ is a distance function, H is a Shannon entropy function, c is a set of skills, X is an implicit structure g is a segmentation, and s is a state;
  a graph neural network to learn the implicit structure of skills from medical treatment demonstrations to define structured skills;
  a meta controller to learn predictable skills;
  a segmentation component to learn to decompose the demonstrations into segments corresponding to skills that are transferrable across different tasks concurrently with learning relationships between the skills; and
  a treatment component to provide a medication to a patient in accordance with the learned policies to treat the given disease.

12. The system of claim 11, wherein the demonstrations are expert trajectories generated by an expert policy for medication.

13. The system of claim 12, wherein each of the expert trajectories includes state-action pairs.

14. The system of claim 13, wherein the skills correspond to subsequences of the state-action pairs extracted from the expert trajectories.

15. The system of claim 11, wherein the relationship between the skills is learned by employing a graph generator decoder to predict a graph probability distribution over latent interaction of the skills and a graph decoder to generate skills conditioned on a graph structure.

16. The system of claim 11, wherein the learned policy for medication is optimized based on gradients of an imitation learning loss with respect to expert demonstrations.

* * * * *